G. HEGER.
OSCILLATING MOTOR.
APPLICATION FILED JUNE 13, 1910.
1,009,066.
Patented Nov. 21, 1911.
3 SHEETS—SHEET 1.
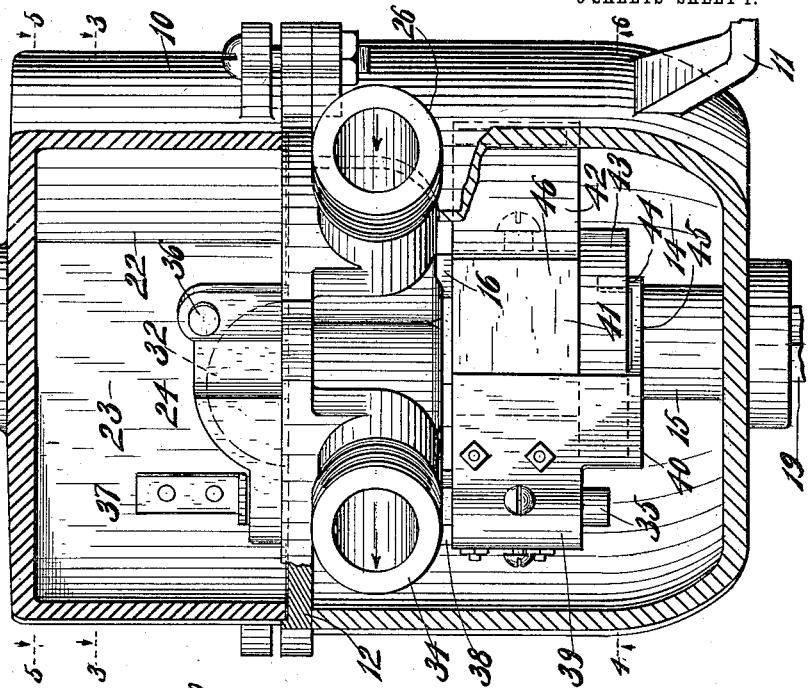
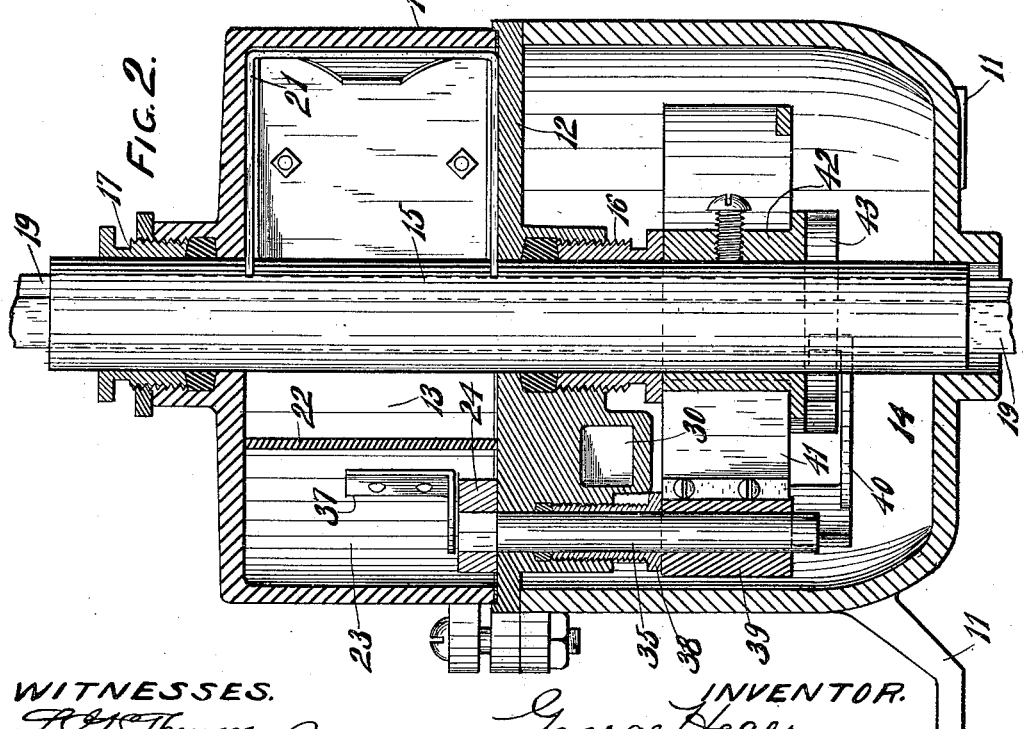
WITNESSES.
INVENTOR.
George Heger,
By Benedict, Morsell & Caldwell,
ATTORNEYS.

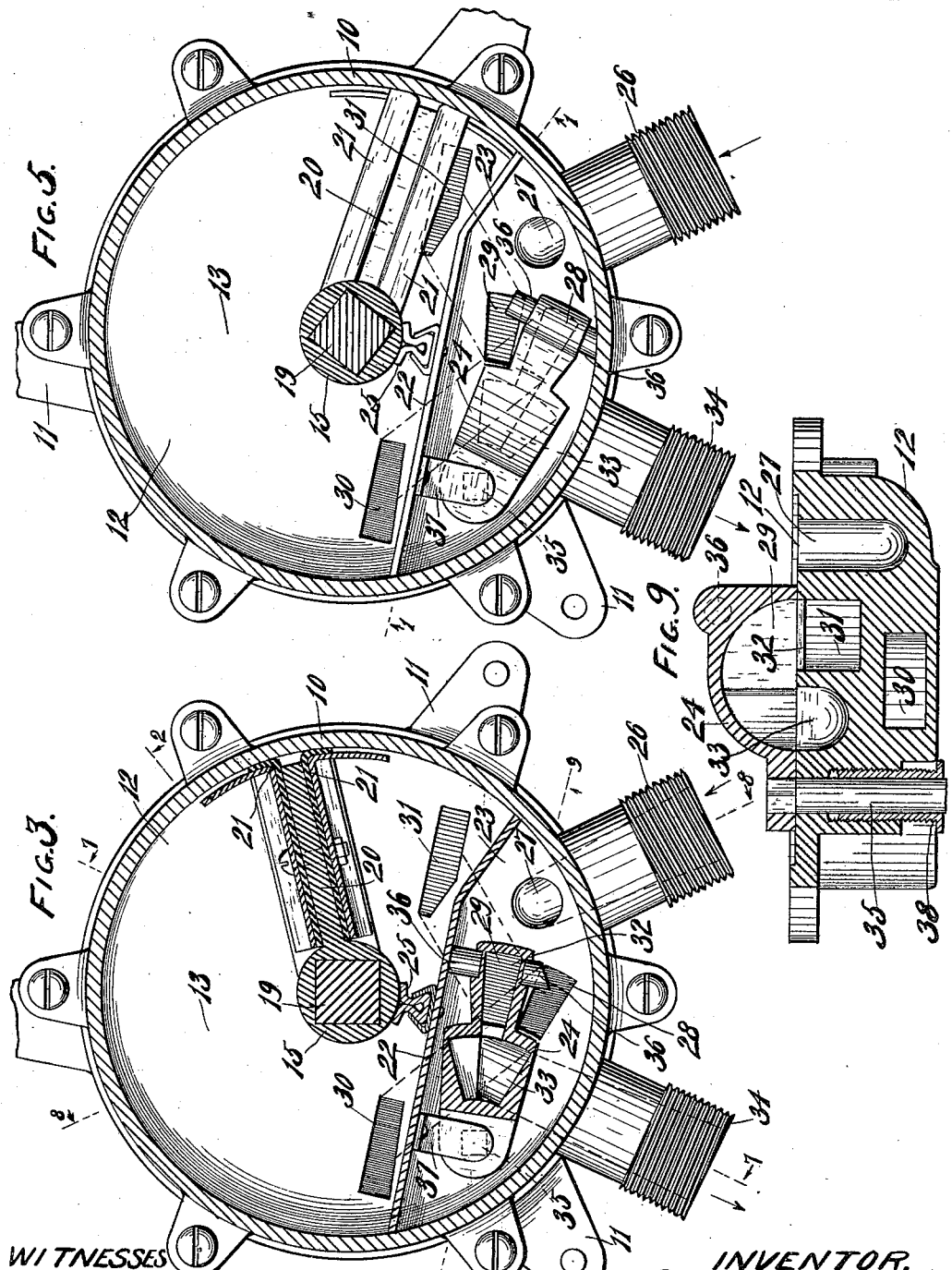

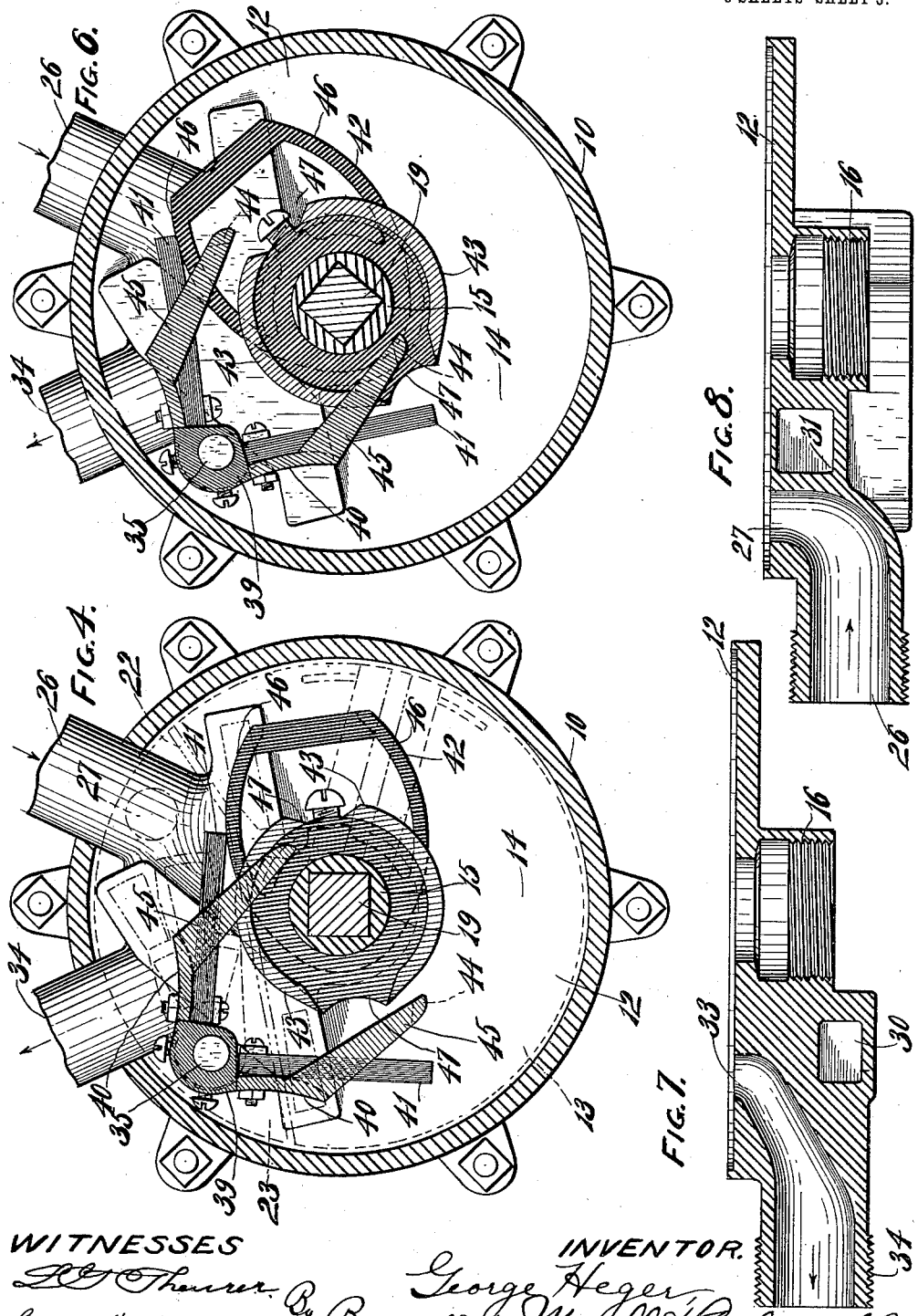

UNITED STATES PATENT OFFICE.

GEORGE HEGER, OF MILWAUKEE, WISCONSIN, ASSIGNOR OF ONE-HALF TO WILLIAM F. BARENZ, OF MILWAUKEE, WISCONSIN.

OSCILLATING MOTOR.

1,009,066.  Specification of Letters Patent.  Patented Nov. 21, 1911.

Application filed June 13, 1910. Serial No. 566,541.

*To all whom it may concern:*

Be it known that I, GEORGE HEGER, residing in Milwaukee, in the county of Milwaukee and State of Wisconsin, have invented new and useful Improvements in Oscillating Motors, of which the following is a description, reference being had to the accompanying drawings, which are a part of this specification.

This invention relates to improvements in oscillating motors.

One of the objects of this invention is to provide an improved form of motor of the oscillating type which is simple in construction and operation and although particularly adapted for use in operating washing machines, it may be used for actuating various kinds of machinery.

A further object of this invention is to provide a motor in which the valve controlling the power medium is positively held and prevented from moving until the motor piston has moved to substantially the end of its stroke.

A further object of the invention is to provide an oscillating motor with an improved form of valve controlling mechanism which is located outside of the piston chamber in order to be easily accessible in case repairs are necessary.

With the above, and other objects in view, the invention consists of the oscillating motor and its parts and combinations as set forth in the claims, and all equivalents thereof.

In the accompanying drawings in which the same reference characters indicate the same parts in all of the views; Figure 1 is a vertical section view of the motor taken on line 1—1 of Fig. 5, parts being shown in full line; Fig. 2 is a vertical sectional view thereof taken on line 2—2 of Fig. 3 with the piston swung slightly more to the left; Fig. 3 is a horizontal sectional view of the motor taken on line 3—3 of Fig. 1; Fig. 4 is an inverted sectional view taken on line 4—6 of Fig. 1; Fig. 5 is a horizontal sectional view taken on line 5—5 of Fig. 1; Fig. 6 is an inverted horizontal sectional view taken on line 4—6 of Fig. 1; Fig. 7 is a sectional view of the lower portion of the motor casing taken on line 7—7 of Fig. 3; Fig. 8 is a similar view taken on line 8—8 of Fig. 3; and Fig. 9 is a detail sectional view of the valve and the valve plate.

Referring to the drawings the reference numeral 10 indicates the motor casing which may be of any desired shape or size, but is preferably of cylindrical form provided with supporting legs 11 for convenience in fastening the casing to a washing machine.

The casing is divided medially by a partition valve plate 12 to form an upper piston chamber 13 and a lower valve mechanism chamber 14. A vertically positioned tubular rock shaft 15 extends centrally through the valve plate and the top and bottom portions of the casing and the valve plate and the top of the casing are provided with stuffing nuts 16 and 17 respectively, to form a water tight piston chamber. The opening 18 through the tubular shaft is square in cross section to accommodate a square shaft 19 which is adapted to be connected to a washing machine or other mechanism to be operated.

A piston 20 forming part of the tubular rock shaft and extending radially therefrom to the walls of the casing is provided with suitable packing plates 21 to form a water tight joint between the piston and the casing.

The piston chamber is divided vertically by a partition 22 positioned adjacent to one side of the tubular shaft to form a valve chamber 23 in which is located an oscillating valve 24 adapted to control the flow of the power medium to and from the piston chamber. A packing 25 is interposed between the partition 22 and the tubular shaft 15 to form a water tight joint between these two members. An inlet pipe 26 formed integral with the valve plate 12 communicates with the interior of the valve chamber through the inlet opening 27 and is adapted to admit the power medium to said chamber. The power medium will fill the valve chamber and exert a constant pressure on the oscillating valve and serve to form a liquid tight joint between the working face of the valve and the valve plate 12. Two ports 28 and 29 provided in the valve plate and communicating with passageways 30 and 31 respectively, lead into the piston chamber on opposite sides of the piston and are adapted to alternately supply the said chamber with the power medium. The oscillating valve 24 is provided with a recess 32 in its sliding face which is adapted to register with an exhaust opening 33 and alternately with one or the other of the ports 28 and 29 so as to permit the escape of the power medium from the piston chamber alternately from opposite sides of the piston when said power medium has performed its function. The exhaust opening 33 is in communication with the exhaust pipe 34 formed integral with the valve plate 12.

The oscillating valve is mounted on the upper squared end of an oscillating valve shaft 35 which extends through and is journaled in the valve plate 12. The oscillating valve is provided with leather bumpers 36 positioned to strike against the casing 10 and the partition 22 to limit the movement of the valve and to also deaden the sound of the blow. An angle plate 37 fastened to the partition and extending above the top of the valve and a slight distance therefrom is adapted to prevent said valve from leaving the valve plate.

A stuffing nut 38 serves to prevent leakage of the power medium through the opening in the valve plate through which the valve shaft extends.

A trip lever 39 consisting of a member having two arms 40 extending at an angle therefrom is rigidly connected to the lower portion of the valve shaft 35 and has connected thereto leaf springs 41 positioned to yieldingly bear on opposite sides of a cam member 42 rigidly carried by the tubular rock shaft. The cam member 42 has depending therefrom two semicircular trip flanges 43 positioned substantially concentric with relation to the tubular shaft and one on each side thereof and which are adapted to be engaged on their inner curved faces by lugs 44 extending upwardly from the outer ends of extension arms 45 projecting from the arms 40. The semicircular trip flanges serve to hold the valve in full open position while the piston is swinging from one end of its stroke to the other and also while the tension of the leaf springs are alternately being augmented by engaging the faces 46 of the cam member 42. The ends of the semicircular trip flanges are spaced a sufficient distance apart as indicated by numeral 47 to permit the upwardly extending lugs 44 to alternately pass into and out of engagement with said trip flanges when the piston has substantially reached the end of each stroke.

The cam member with its depending trip flanges are so positioned with relation to the piston that the valve will be positively moved by the leaf springs to reverse the direction of feed and exhaust of the power medium when the said piston reaches each end of its stroke.

The operation of the motor is as follows, assuming that the parts are in the position shown in Figs. 3 and 4 the power medium will enter the valve chamber 23 through the inlet pipe 26 and inlet opening 27 and will pass from said chamber into the piston chamber through the passageway 28 and will swing the piston to the right as shown in Fig. 3. This movement will cause the upper cam face (looking at Fig. 4) to engage the upper leaf spring and put it under tension and the upstanding lug 44 to bear yieldingly against the inner face of the upper semicircular trip flange 43 and prevent any movement of the valve. The power medium in the piston chamber on the opposite side of the piston will pass out through the passageway 31, port 29, to the recess of the valve and from the valve to the exhaust port 33 and pipe 34 to the exterior of the casing. As soon as the piston has reached the end of its movement the spaces between the depending flanges will have moved into register with the upstanding lugs, the lug of the upper arm (looking at Fig. 4) will pass out of engagement with the upper flange and the lower lug will swing into the lower space and into engagement with the inner face of the lower flange. This movement will rock the valve shaft to move the valve to uncover the port 29 and cover the port 28 and reverse the direction of feed of the power medium to the opposite side of the piston and thus reverse the direction of movement of the piston and the same operation of the ports will take place at the other end of the stroke and thus cause the oscillation of the said piston as long as the power medium is supplied to the motor.

From the foregoing description it will be seen that the direction of flow of the power medium is quickly and positively reversed at the end of each piston stroke and that the valve cannot stop at any intermediate position.

What I claim as my invention is.

1. An oscillating motor comprising a casing having a valve chamber provided with openings, a pivoted valve controlling said openings, a trip member connected to said valve and provided with a yielding means for causing it to move, an oscillating piston within the casing, and means connected to the piston for putting the yielding means under tension and for positively holding the trip member in a certain position until the piston has reached substantially the end of its stroke.

2. An oscillating motor comprising a casing having a piston chamber and a valve chamber, a valve plate forming part of the casing and provided with valve chamber ports in communication with the piston chamber and also provided with an exhaust port, a valve covering the exhaust port and alternately one of the valve chamber ports, a valve shaft connected to said valve, a trip valve member connected to said valve and provided with a yielding means for causing it to move, an oscillating piston within the casing, a cam member connected to the piston for putting the yielding means under tension, and means for releasably and positively holding the trip valve member against movement until the piston has reached substantially the end of its stroke.

3. An oscillating motor comprising a casing having a piston chamber and a valve chamber, a valve plate forming part of the casing and provided with valve chamber ports in communication with the piston chamber and also provided with an exhaust port, a valve covering the exhaust port and alternately one of the valve chamber ports, a valve shaft connected to said valve, a trip member connected to said valve and provided with a yielding means for causing it to move, an oscillating piston within the casing, a cam member connected to the piston for engaging the yielding means and putting it under tension, and semicircular means for releasably and positively holding the valve member against movement until the piston has reached substantially the end of its stroke.

4. An oscillating motor comprising a casing having a piston chamber and a valve chamber, a valve plate forming part of the casing and provided with valve chamber ports in communication with the piston chamber and also provided with an exhaust port, a valve covering the exhaust port and alternately one of the valve chamber ports, a valve shaft connected to said valve, a trip valve member connected to said valve and provided with a yielding means for causing it to move, an oscillating piston within the casing, a cam member connected to the piston for engaging the yielding means and putting it under tension, and semicircular flanges depending from the cam member for releasably and positively holding the valve trip member against movement until the piston has reached substantially the end of its stroke.

5. An oscillating motor comprising a casing having a piston chamber and a valve chamber, a valve plate forming part of the casing and provided with valve chamber ports in communication with the piston chamber and also provided with an exhaust port, a recessed valve covering the exhaust port and alternately one of the valve chamber ports, a valve shaft connected to said valve and extending through the valve plate, a trip member fastened to the valve shaft and provided with springs extending therefrom and with engaging arms, a piston shaft journaled in the casing and having a piston radiating therefrom, a cam member connected to the piston shaft for engaging the springs and putting them under tension, and semicircular flanges connected to the piston shaft for releasably and positively holding the valve trip member against movement until the piston has reached substantially the end of its stroke.

6. An oscillating motor comprising a casing having a piston chamber and a valve chamber, a valve plate forming part of the casing and provided with valve chamber ports in communication with the piston chamber and also provided with an exhaust port, a recessed valve covering the exhaust port and alternately one of the valve chamber ports, a valve shaft connected to said valve and extending through the valve plate, a trip member connected to the valve shaft and having arms extending therefrom provided with upstanding lugs, springs connected to said trip member, a piston shaft journaled in the casing and having a piston radiating therefrom and positioned within the piston chamber, a cam member connected to the piston shaft and interposed between the springs and connected to the trip member for putting said springs under tension, and semicircular flanges connected to the piston shaft for releasably engaging and positively holding the lugs of the arms to prevent movement of the valve until the piston has reached substantially the end of its stroke.

7. An oscillating motor comprising a casing having a piston chamber and a valve chamber, a valve plate forming part of the casing and provided with valve chamber ports in communication with the piston chamber and also provided with an exhaust port, a recessed valve covering the exhaust port and alternately one of the valve chamber ports, a valve shaft connected to said valve and extending through the valve plate, a trip member connected to the valve shaft and having arms extending therefrom provided with upstanding lugs, leaf springs connected to said trip member and radiating therefrom, a piston shaft journaled in the casing and having a piston radiating therefrom and positioned within the piston chamber, a cam member connected to the piston shaft outside of the piston chamber and interposed between the leaf springs connected to the valve shaft for alternately engaging and putting one of said springs under tension, and semicircular flanges connected to the piston shaft for releasably engaging and positively holding the lugs of the arms to prevent movement of the valve until the piston has reached substantially the end of its stroke.

8. An oscillating motor comprising a casing having a piston chamber and a valve chamber, a valve plate forming part of the casing and provided with valve chamber ports in communication with the piston chamber and also provided with an exhaust port, a recessed valve covering the exhaust port and alternately one of the valve chamber ports, a valve shaft connected to said valve and extending through the valve plate, a trip member connected to the valve shaft and having arms extending therefrom provided with upstanding lugs, leaf springs connected to said trip member and radiating therefrom, a piston shaft journaled in the casing and having a piston radiating therefrom and positioned within the piston chamber, a cam member connected to the piston shaft outside of the piston chamber and interposed between the leaf springs connected to the valve shaft for alternately engaging and putting one of said springs under tension, and semicircular flanges connected to the piston shaft for releasably engaging and positively holding the lugs of the arms to prevent movement of the valve until the piston has reached substantially the end of its stroke, the ends of the semicircular flanges being spaced apart to permit the ingress and egress of the lugs between the flanges.

In testimony whereof, I affix my signature, in presence of two witnesses.

GEORGE HEGER.

Witnesses:
C. H. KEENEY,
LAURA A. KELLEY.

Copies of this patent may be obtained for five cents each, by addressing the "Commissioner of Patents, Washington, D. C."